UNITED STATES PATENT OFFICE.

NATHAN SULZBERGER, OF BERLIN, AND LEOPOLD SPIEGEL, OF CHARLOTTENBURG, GERMANY.

ESTERS OF SALICYLIC-ACID DERIVATIVES AND PROCESS OF MAKING THE SAME.

987,771. Specification of Letters Patent. Patented Mar. 28, 1911.

No Drawing. Application filed June 1, 1905. Serial No. 263,337.

*To all whom it may concern:*

Be it known that we, NATHAN SULZBERGER, doctor of philosophy, chemist, a citizen of the United States, residing at 39 Unter den Linden, Berlin, Kingdom of Prussia, German Empire, and LEOPOLD SPIEGEL, doctor of philosophy, private docent of chemistry at the Berlin University, a subject of the King of Prussia, German Empire, residing at 24 Schlüterstrasse, Charlottenburg, Kingdom of Prussia, German Empire, have jointly invented new and useful Improvements in Esters of Salicylic-Acid Derivatives and Processes of Making the Same, of which the following is a specification.

The object of our invention is to make compounds of salicylic acid which are easily and without any irritating action absorbed by the skin and are decomposed within the organism with liberation of salicylic acid.

Our process consists in combining derivatives of salicylic acid, containing the free phenolic group but in which the hydroxylic group of the carboxylic group is substituted by other groups, with aliphatic acids containing more than 12 atoms of carbon in their molecule, with elimination of water. By this reaction esterlike compounds of salicylic acid with the said aliphatic acids will be produced; the phenol group of the salicylic acid (or its derivatives) reacting with the carboxylic group of the aliphatic acids.

As derivatives of salicylic acid, we use derivatives of salicylic acid in which the hydroxyl of the carboxylic group has been replaced by other groups, in order to avoid involving the carboxylic group in the reaction. We may use the esters of the salicylic acid with alcohol radicals. The skilled workman will find the compounds suitable for his purpose by experiments. If we use condensing agents containing halogen, we prefer to employ the salts of the aliphatic acids instead of the free acids in order to neutralize the free acids evolved in the process or to avoid and diminish the formation of them.

In order to enable the skilled workman to carry out our invention we describe as an example the manufacture of the oleyl salicylic ethyl ester "oleyl" meaning the group $C_{18}H_{33}O$, whereas the oleic acid is $C^{18}H^{34}O_2$. We heat a mixture of 332 grams salicylic ethyl ester, 608 grams oleate of sodium and 153.5 grams oxy-chlorid of phosphorus in a suitable vessel to a temperature of about 100 degrees centigrade until the reaction is finished. We may also use higher temperatures, in which case the reaction will be finished more quickly. The reaction may be represented by the following equation:

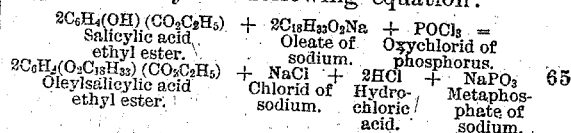

We may also use free oleic acid instead of the sodium oleate. In this case we use 564 grams oleic acid instead of the 608 grams oleate of sodium quoted in the above described example. In order to neutralize the acid, that may be formed during the reaction, we prefer to add to the mixture neutralizing agents having no saponifying action, as for instance carbonate of calcium. We use for instance 200 grams carbonate of calcium, if we employ the above quoted proportions. Of course we may also employ larger or smaller quantities of the neutralizing agents. In order to separate the by-products from the desired compound, we may wash the product of the reaction with water.

The oleyl salicylic ethyl ester purified in the described manner has the composition $C_{27}H_{42}O_4$, as in the analysis we have found the following proportion: C=74.81% (calculated 75.29%) H=10.32 (calculated 9.84%).

The above quoted proportions of the components for manufacturing our new products give essentially oleyl salicylic acid ester. We may, however, change the proportions, so that we use a surplus of oleic acid or a surplus of salicylic acid or their derivatives. We obtain then mixtures of the oleyl salicylic acid ester with oleic acid or with salicylic acid ester. One can separate the said surplus by heating the product of the reaction in the first case with alkaline carbonates of calcium, barium, or such like, in the second case by shortly blowing off with steam the uncombined salicylic acid ester. One may also use the product of the reaction containing a surplus of one of the components without a separation of the surplus.

The condensing agent can be used in the amount required by the theory represented by the equation above quoted. We may however use larger or smaller proportions. One may mix the whole quantity of the condensing agent used with the components or may add the condensing agent gradually.

The oleyl salicylic acid ethyl ester is an oily mass, solidifies when cooled and melts then at about 10 degrees centigrade. It is easily absorbed by the skin without having an irritating action and is decomposed in the organism with liberation of salicylic acid. It is soluble in oils and fats, is non volatile, does not decompose carbonates.

Instead of the salicylic acid ethyl ester, one may use other esters of this acid or other derivatives of the salicylic acid containing the free phenol group, wherein the carboxylic group is suitably changed so as to prevent it from taking part in the reaction. In the place of the oleic acid one may also use other fatty acids as erucic acid, brassidic, elaidic, ricinoleic, palmitic, stearic acid, etc. The stearyl salicylic acid ethyl ester prepared by heating salicylic ethyl ester and stearic acid with or without condensing agents, is, when purified in the manner described for oleyl salicylic acid ethyl ester, a white crystalline mass of the composition

C=74.89% C, 10.78% H corresponding to the formula:

It melts at about 48 to 49° C. One may also use mixtures of the said acids, for instance as one may obtain them by saponifying fats and oils.

The resulting compounds have oily consistency or are solid substances, soluble in oil and fats. One may mix them with indifferent substances, as lycopodium, starch meal, etc., in order to prepare dusting powders. They have antiseptic action. The compounds of our invention may also be used as cosmetical and pharmaceutical preparations either alone or mixed with oils, fats, indifferent substances, either internally or externally.

What we claim as our invention and desire to secure by Letters Patent is:—

1. The process of manufacturing ester-like compounds of aliphatic acids with salicylic acid derivatives which consists in heating together condensing agents, and an aliphatic acid having more than 12 atoms of carbon with derivatives of salicylic acid in which the hydrogen of the hydroxyl of the carboxylic group has been replaced by a neutral group and the phenol hydroxyl remains unchanged.

2. The process of manufacturing ester-like compounds of aliphatic acids with salicylic acid which consists in heating together condensing agents, substances able to neutralize acids, and an aliphatic acid having more than 12 atoms of carbon with derivatives of salicylic acid in which the hydrogen of the hydroxyl of the carboxylic group has been replaced by a nonacid group and the hydroxyl remains unchanged.

3. The process of manufacturing oleyl salicylic alkyl ester which consists in heating salicylic alkyl ester with oleic acid and condensing agents.

4. As new articles of manufacture esters of salicylic acid derivatives with aliphatic acids, having more than 12 atoms of carbon in the molecule, said esters having the general formula:

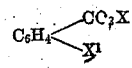

in which formula "X" means a neutral group substituting the hydrogen of the carboxylic hydroxyl of salicylic acid, and X,RCOO, the radical of an aliphatic acid, RCOO/H, containing more than 12 atoms of carbon, soluble in oils and fats, not volatile, being decomposed by alkalis into salicylic acid and fatty acid, which esters are absorbed by the skin without an irritating action and are decomposed in the organism with liberation of salicylic acid.

5. As new article of manufacture oleyl salicylic acid ethyl ester being at ordinary temperature an oil melting at about 10 degrees centigrade solidifying below 0 degrees centigrade, soluble in oil, and fats, not volatile, being decomposed by alkalis into salicylic acid and oleic acids.

In testimony whereof we have signed our names to this specification in the presence of two subscribing witnesses.

NATHAN SULZBERGER.
LEOPOLD SPIEGEL.

Witnesses:
HENRY HASPER,
WOLDEMAR HAUPT,